(12) United States Patent
Furumochi

(10) Patent No.: US 11,895,410 B2
(45) Date of Patent: Feb. 6, 2024

(54) IMAGE PROCESSING APPARATUS AND CONTROL METHOD THEREFOR, AND IMAGE CAPTURING APPARATUS

(71) Applicant: CANON KABUSHIKI KAISHA, Tokyo (JP)

(72) Inventor: Hiroyuki Furumochi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 264 days.

(21) Appl. No.: 17/542,076

(22) Filed: Dec. 3, 2021

(65) Prior Publication Data

US 2022/0094849 A1    Mar. 24, 2022

Related U.S. Application Data

(63) Continuation of application No. PCT/JP2020/017769, filed on Apr. 24, 2020.

(30) Foreign Application Priority Data

Jun. 7, 2019  (JP) ................................. 2019-107450

(51) Int. Cl.
*H04N 23/951* (2023.01)
*G06T 1/20* (2006.01)
*H04N 23/63* (2023.01)
*H04N 23/65* (2023.01)

(52) U.S. Cl.
CPC ............ *H04N 23/951* (2023.01); *G06T 1/20* (2013.01); *H04N 23/63* (2023.01); *H04N 23/65* (2023.01)

(58) Field of Classification Search
None
See application file for complete search history.

(56) References Cited

U.S. PATENT DOCUMENTS

2023/0266811 A1* 8/2023 Watanabe ............. G06F 1/3206
713/323

FOREIGN PATENT DOCUMENTS

| JP | 2000-312327 A | 11/2000 |
| JP | 2008-199257 A | 8/2008 |
| JP | 2008-219319 A | 9/2008 |
| JP | 2016-076760 A | 5/2016 |
| JP | 2018-137822 A | 8/2018 |

OTHER PUBLICATIONS

Foreign Patents 1-2 and 4 were cited in the International Search Report dated Jul. 20, 2020 of International Application No. PCT/JP2020/017769.

* cited by examiner

*Primary Examiner* — James M Hannett
(74) *Attorney, Agent, or Firm* — Cowan, Liebowitz & Latman, P.C.

(57) ABSTRACT

An image processing apparatus comprises a first processor that processes an image signal output from an image sensor; a second processor, connected in downstream of the first processor, that processes an image signal transferred from the first processor; and a controller that selects any of the first processor and the second processor to be used to perform a predetermined process on the image signal output from the image sensor based on a predetermined condition. The controller controls to stop an operation of the second processor in a case where the controller selects the first processor, the predetermined condition includes an instruction for live view display, and the controller selects the first processor in a case where the live view display is instructed.

16 Claims, 13 Drawing Sheets

IMAGE PROCESSING APPARATUS AND CONTROL METHOD THEREFOR, AND IMAGE CAPTURING APPARATUS

CROSS-REFERENCE TO RELATED APPLICATIONS

This application is a Continuation of International Patent Application No. PCT/JP2020/017769, filed Apr. 24, 2020, which claims the benefit of Japanese Patent Application No. 2019-107450, filed Jun. 7, 2019, both of which are hereby incorporated by reference herein in their entirety.

BACKGROUND OF THE INVENTION

Field of the Invention

The present invention relates to an image processing apparatus and control method therefor, and an image capturing apparatus.

Background Art

Recently, in order to enable high-speed continuous shooting of still images, there is an image sensor that transfers image data from the image sensor at a high bit rate. Patent Literature 1 and Patent Literature 2 propose an image capturing apparatus for converting image data transferred from such an image sensor into a single JPEG (Joint Photographic Experts Group) image.

The image capturing apparatus of Patent Literature 1 includes a plurality of back engines that perform JPEG processing on the image data that is sequentially output from the image sensor and has undergone shading correction and the like by the front engine. Then, these back engines share the load of processes to be applied on a series of images obtained by continuous shooting, thereby images are processed at high speed.

It is disclosed that the image capturing apparatus of Patent Literature 2 includes a first image processing unit and a second image processing unit. When the image data is output from an image sensor at a high frame rate, the second image processing unit generates image data of a smaller number of frames by synthesizing the plurality of frames of image data and sequentially sends the resultant image data to the first image processing unit to realize high-speed shooting. Further, when the image data is output from the image sensor at a low frame rate, the second image processing unit does not synthesize the image data and transfers the image data as is to the first image processing unit. The first image processing unit performs shading correction or the like on the image data transferred from the second image processing unit, and further performs JPEG processing on the corrected image data to create one image.

However, in the case of the image capturing apparatus described in Patent Literature 1, there is a problem that power consumption is large because one image is created by operating the front engine and a plurality of back engines.

Further, in the case of Patent Literature 2, the image data is processed by the first image processing unit always via the second image processing unit. Therefore, there is a problem that the power consumption is large because both of the first image processing unit and the second image processing unit are always used regardless of whether the frame rate is high or low.

The present invention has been made in consideration of the above problems, and, in an image processing apparatus provided with two or more processing circuits for processing an image signal, reduces power consumption while obtaining an image having a required image quality.

CITATION LIST

Patent Literature

PTL 1: Japanese Patent Laid-Open No. 2008-219319
PTL 2: Japanese Patent Laid-Open No. 2018-137822

SUMMARY OF THE INVENTION

In order to achieve the above object, provided is an image processing apparatus comprising one or more processors and/or circuitry which functions as: a first processor that processes an image signal output from an image sensor; a second processor, connected in downstream of the first processor, that processes an image signal transferred from the first processor; and a controller that selects the first processor and/or the second processor to be used to perform a predetermined process on the image signal output from the image sensor based on a predetermined condition, wherein the controller controls to stop an operation of the second processor in a case where the controller selects the first processor, the predetermined condition includes an instruction for live view display, and the controller selects the first processor in a case where the live view display is instructed.

Further features of the present invention will become apparent from the following description of exemplary embodiments with reference to the attached drawings.

DESCRIPTION OF THE EMBODIMENTS

Figure 1:
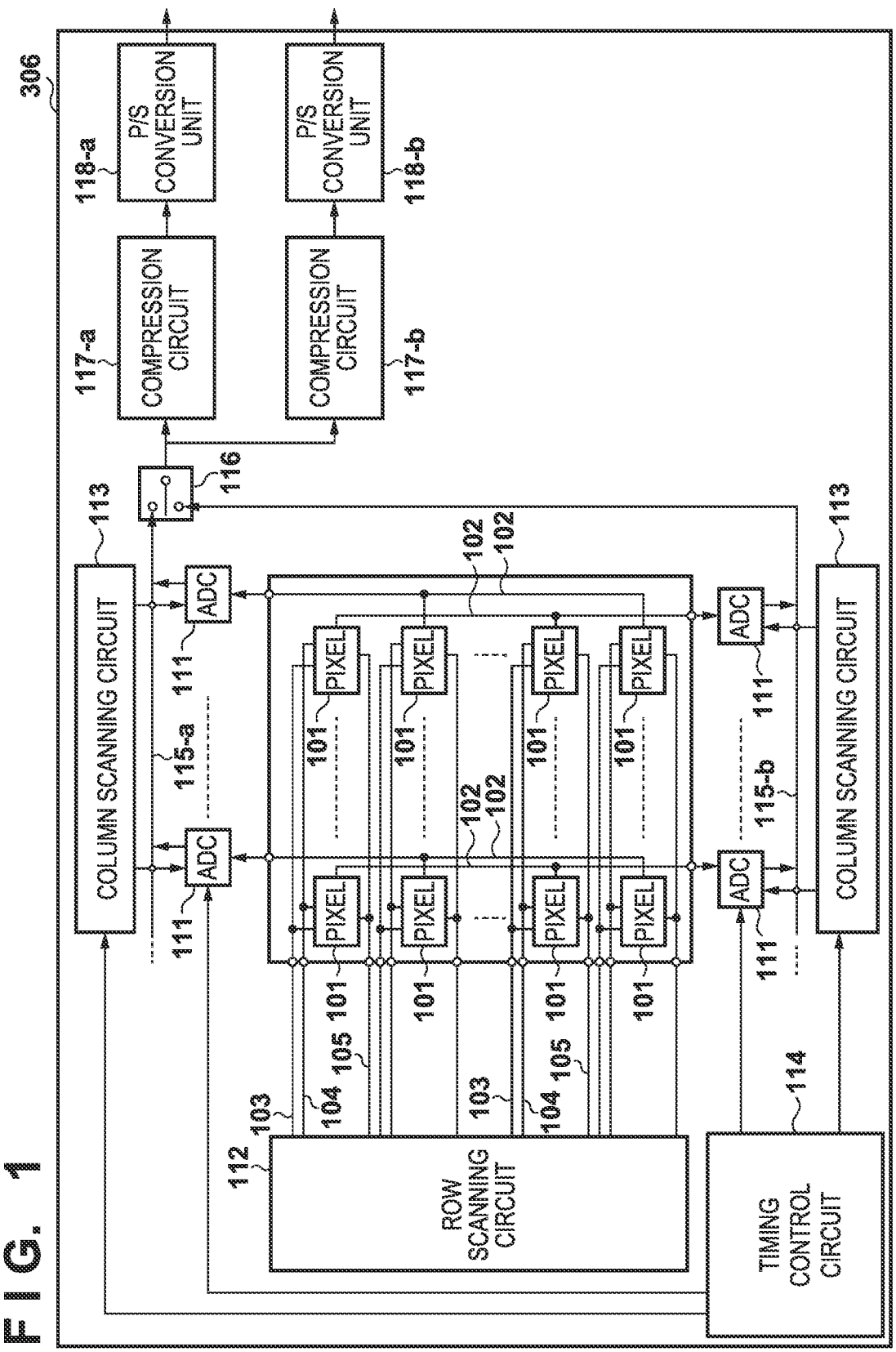
FIG. 1 is a block diagram showing a schematic configuration of an image sensor according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing a schematic configuration of an image sensor according to a first embodiment of the present invention.

An image sensor 306 has a plurality of pixels 101 arranged in a matrix, and is connected to transfer signal lines 103, reset signal lines 104, and row selection signal lines 105 in the horizontal direction (row direction). Further, the pixels 100 in each row of the image sensor 306 are connected to any of a plurality of vertical output lines 102 provided for each row in the vertical direction (column direction). As a result, signals are read out from the pixels in units of a plurality of rows.

Further, the image sensor 306 includes column ADC blocks 111, a row scanning circuit 112, column scanning circuits 113, a timing control circuit 114, and a changeover switch 116. Further, the image sensor 306 has compression circuits 117-a and 117-b, and parallel serial (P/S) conversion units 118-a and 118-b. The changeover switch 116 switches between two image signals output via horizontal signal lines 115-a and 115-b, and outputs the selected image signal. For example, the signals of all lines can be output by alternately selecting the horizontal signal lines 115-a and 115-b, and the signals thinned out every other line can be selected by selecting one of them. The image signal from the changeover switch 116 is input to the compression circuits 117-a and 117-b. In the compression circuits 117-a and 117-b, the image signal is compressed by using the wavelet transform method.

The image sensor 306 can selectively perform normal readout and multi-stream readout. The image signal read out at the time of normal readout or the image signal of a main stream read out at the time of multi-stream readout is compressed by the compression circuit 117-a in accordance with the timing controlled by the timing control circuit 114, and undergoes parallel-serial conversion by the P/S conversion unit 118-a. Then, the converted image signal is output to the outside of the image sensor 306.

In addition, the image signal of the sub-stream read out at the time of multi-stream readout is compressed by the compression circuit 117-b in accordance with the timing controlled by the timing control circuit 114, and undergoes parallel-serial conversion by the P/S conversion unit 118-b, and is output to the outside of the image sensor 306.

The changeover switch 116 may be followed by a memory capable of holding AD converted digital data of one screen or of several lines. Then, by allocating the held data to the compression circuits 117-a and 117-b, it becomes possible to read out the image signal of the main stream and the image signal of the sub-stream at the same time.

Also, as the readout drive, readout drive with different resolutions, such as readout drive for reading out signals from all pixels, readout drive for reading out signals from pixels thinned to ⅓ or ⅕ in the vertical direction, readout drive for reading out signals added in horizontal direction, and readout drive for reading out signals of pixels thinned in the vertical direction and added in the horizontal direction, may be selected.

In the present embodiment, as an example, all-pixel-readout-drive (uncompressed) is used for still image shooting drive, ⅕ vertical thinning and horizontal addition drive (uncompressed) is used for live view drive during a stand-by state of still image shooting, and ⅓ vertical thinning and horizontal addition drive (uncompressed) is used during moving image recording. The ratio of pixels read out in each drive is not limited to these, and may be appropriately changed according to the number of pixels in the image sensor 306 and the capability of each circuit.

Figure 2:
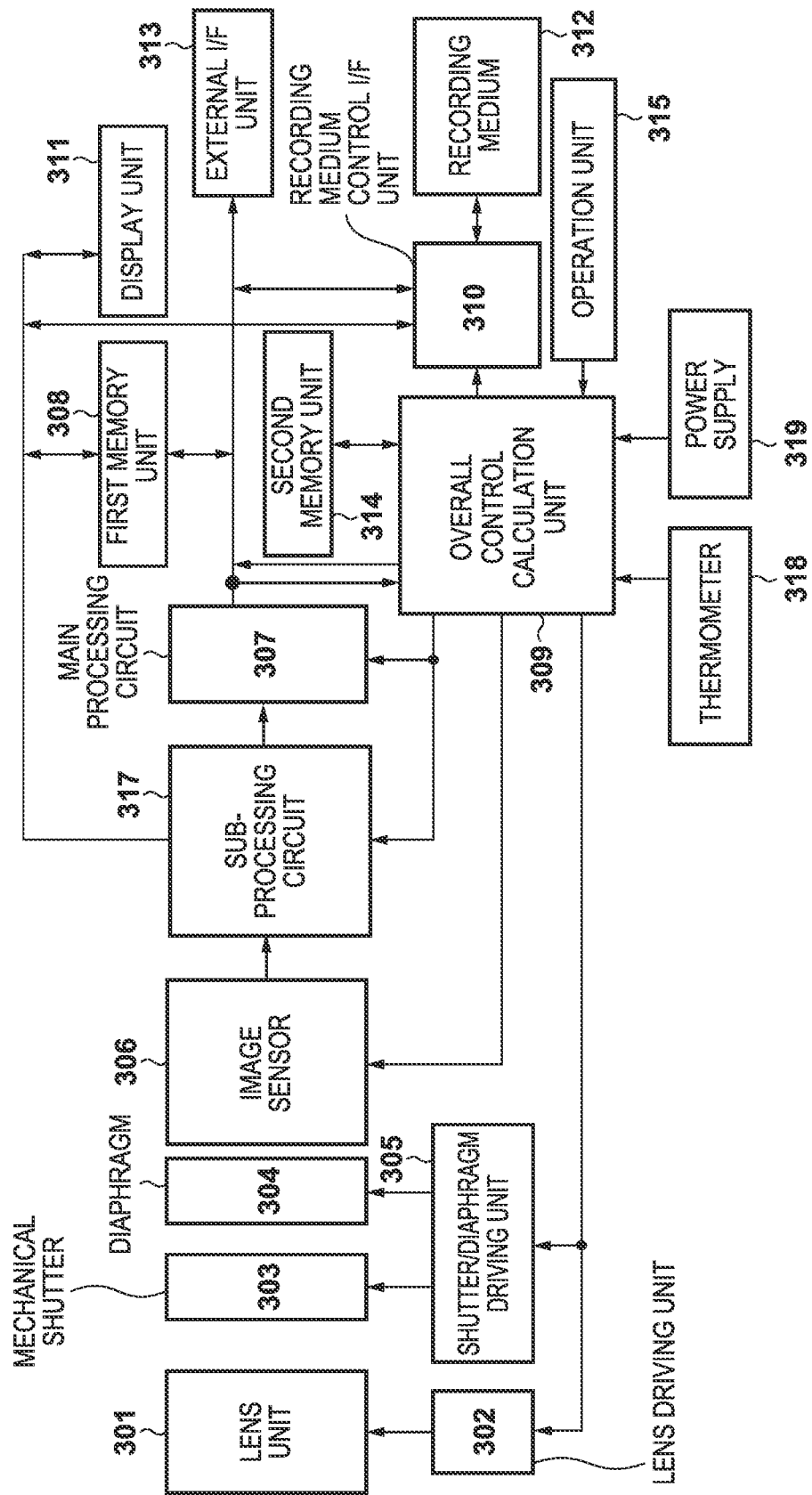
FIG. 2 is a block diagram showing a schematic configuration of an image capturing apparatus according to the embodiment.

FIG. 2 is a block diagram showing a schematic configuration of an image capturing apparatus according to the first embodiment that uses the image sensor 306 having the above configuration.

In FIG. 2, a lens unit 301 is driven by a lens driving unit 302, thereby zooming, focusing, and the like are controlled. A mechanical shutter 303 and a diaphragm 304 are driven and controlled by a shutter/diaphragm driving unit 305. A subject image entering through the lens unit 301 and the mechanical shutter 303 is controlled its amount of light so as to be appropriate by the diaphragm 304, and is formed on the imaging surface of the image sensor 306.

The subject image formed on the imaging surface of the image sensor 306 is photoelectrically converted by the pixels 101, and resultant analog signals of the subject image are converted to digital signals by the column ADC blocks 111 and sent to a sub-processing circuit 317.

The sub-processing circuit 317 performs either the first process or the second process according to the determination described later by an overall control calculation unit 309.

The sub-processing circuit 317 receives the image signal from the image sensor 306, and performs image signal correction, shading correction, and development processing as the first process. Accuracy of the development processing in the sub-processing circuit 317 is controlled lower than that of the development processing installed in a main processing circuit 307 which will be described later. Accordingly, the quality of the image created by the sub-processing circuit 317 is lower than that created by the main processing circuit 307, but the power consumption and circuit scale of the sub-processing circuit 317 are smaller than those of the main processing circuit 307. Then, the developed image signal is displayed on a display unit 311.

In addition, the sub-processing circuit 317 receives the image signal from the image sensor 306, and transfers it as is to the main processing circuit 307 arranged in the downstream of the sub-processing circuit 317 without performing image signal correction, shading correction, or development processing as the second process.

The main processing circuit 307 receives the image signal transferred from the sub-processing circuit 317 in the second process, performs the image signal correction, shading correction, and development processing. In the development processing, low-pass filter processing for reducing noise, sharpness correction for correcting blur of the subject, contrast correction for adjusting the contrast of an image, false color correction for correcting false color, and the like are performed.

Then, the image signal processed by the main processing circuit 307 is recorded on a recording medium 312 via a recording medium control interface (I/F) unit 310 according to the instruction of the overall control calculation unit 309. The recording medium 312 is a detachable storage medium such as a semiconductor memory, and the image signal recorded on the recording medium 312 can be read out via the recording medium control I/F unit 310.

A first memory unit 308 is used to temporarily store the image signal. A second memory unit 314 stores the calculation result of the overall control calculation unit 309. An external interface (I/F) unit 313 is an interface for communicating with an external computer or the like.

An operation unit 315 is used by the user to make various settings and instructions, and includes a shutter release button for instructing the start of still image shooting, a recording button for instructing the start and end of moving image shooting, and the like. The shutter release button is a two-stage switch of switch SW1 and switch SW2, and switch SW1 is turned on in the middle of operation (for example, half-press) and an instruction to perform preparation for still images shooting, such as AF processing, AE processing, AWB processing, and EF processing is issued. Further, when the operation of the shutter release button is completed (for example, full press), the switch SW2 is turned on and an instruction to perform the still image shooting is issued. When the recording button is pressed once, moving image recording is instructed, and when it is pressed during moving image recording, an instruction to stop the recording is issued. The shutter release button and the recording button are not limited to these configurations, and may be any buttons as long as they can instruct the start and end of still image shooting and moving image shooting. Information regarding the driving conditions of the image capturing apparatus set by the user using the operation unit 315 is sent to the overall control calculation unit 309, and the entire image capturing apparatus is controlled based on the information.

A thermometer 318 measures the temperature, and the measured temperature is input to the overall control calculation unit 309, and as will be described later, used to determine whether the image signal is to be processed by the sub-processing circuit 317 or by the main processing circuit 307. A power supply 319 supplies electric power for operating the entire image capturing apparatus. The state of the power supply 319 (remaining battery level) is used to determine whether the image signal is processed by the sub-processing circuit 317 or by the main processing circuit 307, as will be described later.

The overall control calculation unit 309 controls the entire image capturing apparatus and performs various calculations. The overall control calculation unit 309 controls live view display, still image shooting, moving image shooting, etc. according to the conditions set by the user. In addition, the overall control calculation unit 309 determines whether to process the image signal from the image sensor 306 by the sub-processing circuit 317 or by the main processing circuit 307 based on various conditions.

Figure 3:
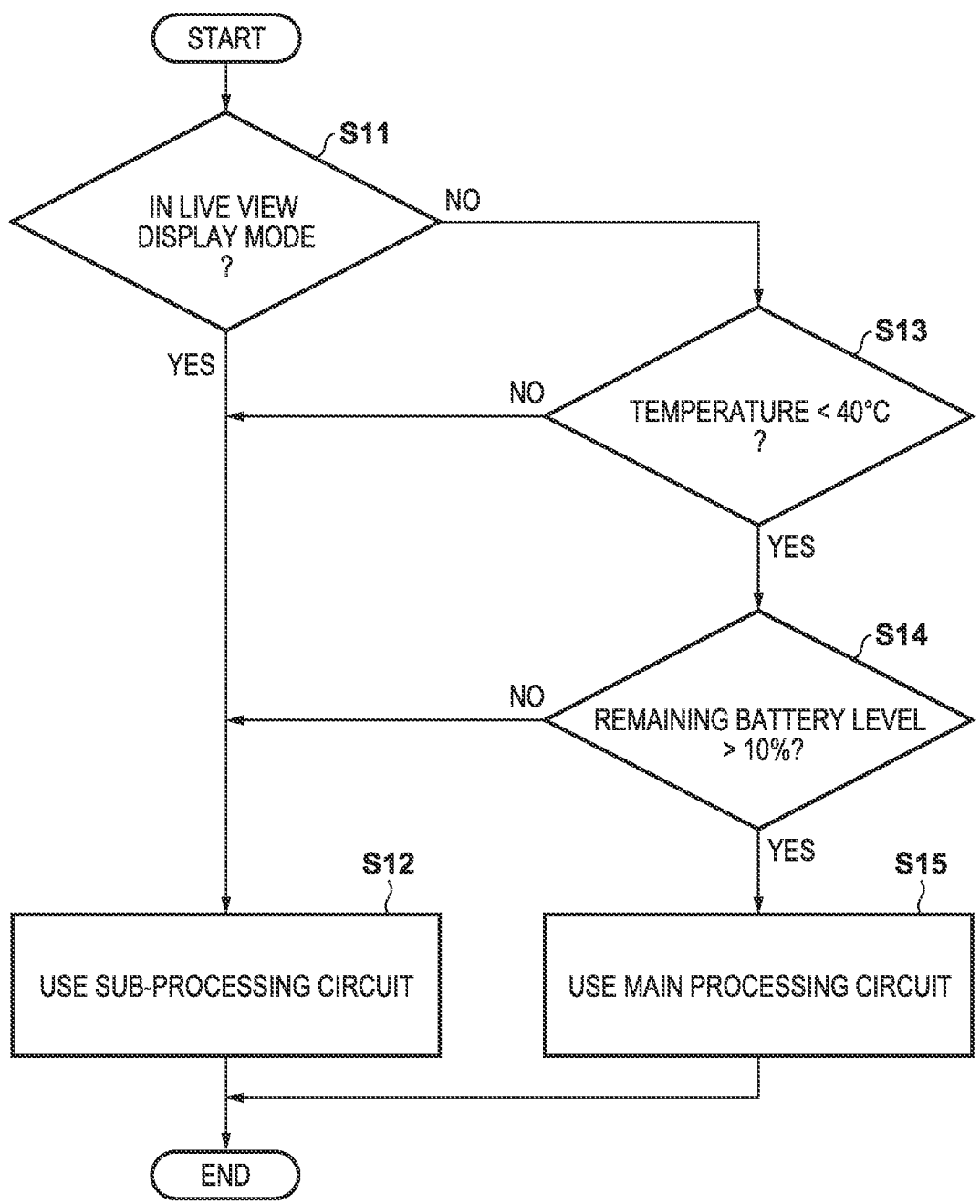
FIG. 3 is a flowchart showing a determination process according to a first embodiment.

FIG. 3 is a flowchart showing determination of whether to process the image signal from the image sensor 306 by the sub-processing circuit 317 or by the main processing circuit 307, which is performed by the overall control calculation unit 309 at the time of normal readout in the first embodiment.

First, in step S11, the overall control calculation unit 309 determines whether the user has set a live view display mode using the operation unit 315. In the case of the live view display mode, the process proceeds to step S12, and it is determined that the sub-processing circuit 317 is to be used.

On the other hand, if the live view display mode is not set, the process proceeds to step S13, where the temperature detected by the thermometer 318 is acquired, and it is determined whether or not the temperature is less than 40° C. If the temperature is 40° C. or higher, the process proceeds to step S12 and it is determined that the sub-processing circuit 317 is to be used. Note that 40° C. is merely an example, and can be appropriately changed depending on the exterior and shape of the image capturing apparatus.

If it is determined in step S13 that the temperature is less than 40° C., the process proceeds to step S14, the remaining battery level of the power supply 319 is measured, and it is determined whether or not the remaining battery level exceeds 10%. Note that 10% of the remaining battery level is merely an example, and can be appropriately changed depending on the power consumption of the entire image capturing apparatus and the like.

If it is determined in step S14 that the remaining battery level exceeds 10%, the process proceeds to step S15 and it is determined that the main processing circuit 307 is to be used. On the other hand, if the remaining battery level is 10% or less, the process proceeds to step S12 and it is determined that the sub-processing circuit 317 is to be used.

Figure 4:
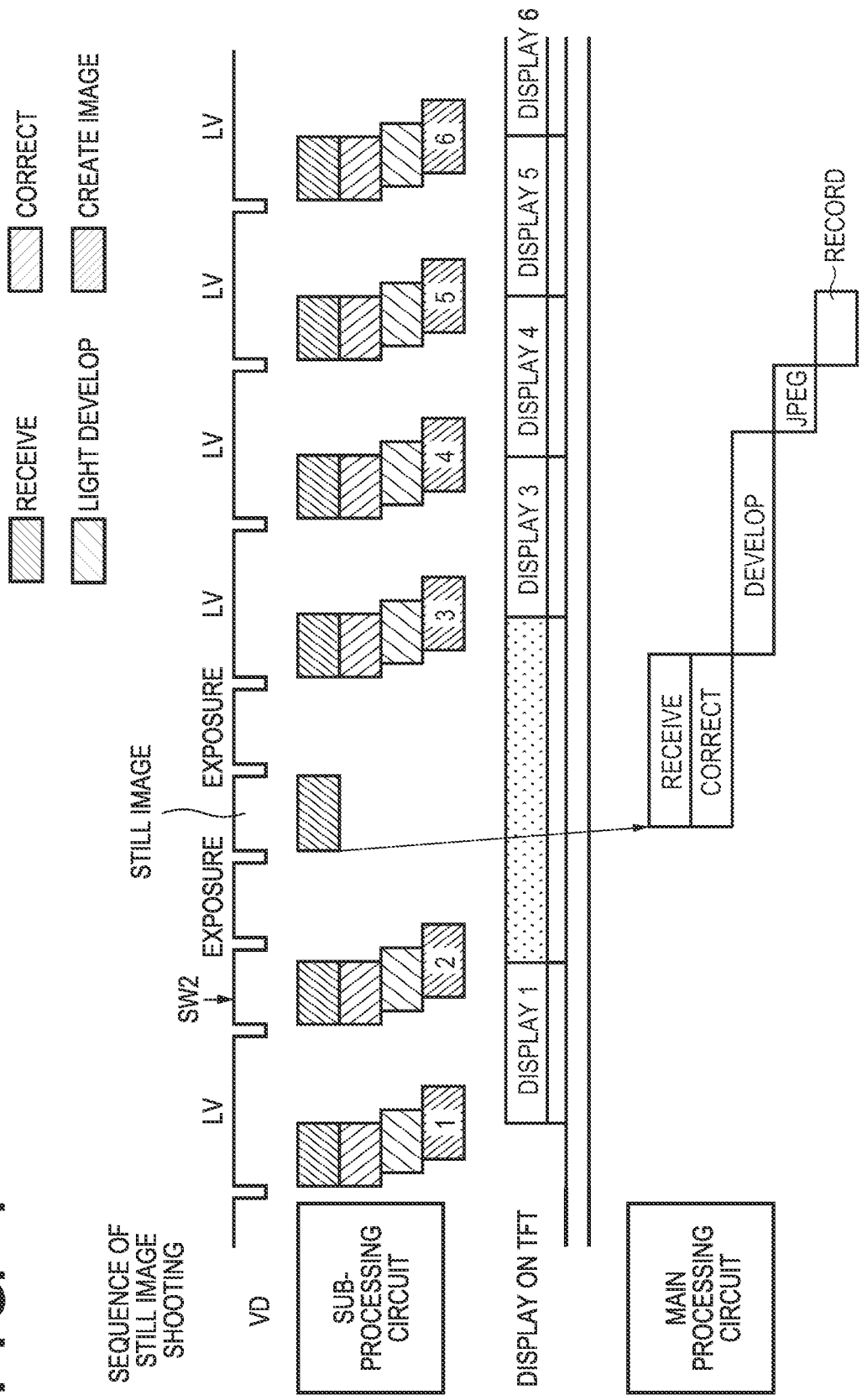
FIG. 4 is a timing diagram showing operation timing of the image sensor and operation timings of a main processing circuit and a sub-processing circuit according to the first embodiment.

FIG. 4 is a timing diagram showing the operation timing of the image sensor 306 and the operation timings of the main processing circuit 307 and the sub-processing circuit 317 in the first embodiment. Here, an example is shown in the case where it is determined that the main processing circuit 307 is to be used by the determination process shown in FIG. 3 at the time of still image shooting.

During live view display (LV), the sub-processing circuit 317 receives the image signal from the image sensor 306, and the image created through correction and development processing is displayed on the display unit 311.

When the user presses the shutter release button (not shown) included in the operation unit 315 to turn on the switch SW2, the image sensor 306 switches to the still image shooting drive. Then, if it is determined that the main processing circuit 307 is to be used according to the flowchart shown in FIG. 3, the image signal from the image sensor 306 received by the sub-processing circuit 317 is transferred to the main processing circuit 307. In the main processing circuit 307, correction and development processing are performed, and the obtained image signal is saved in the recording medium 312.

When the readout of the image sensor 306 in the still image shooting drive is completed, the live view display (LV) is restored, the image signal from the image sensor 306 is received by the sub-processing circuit 317, correction and development processing are performed, and the created image is displayed on the display unit 311.

As described above, after the readout of the image sensor 306 in the still image shooting drive is completed, the live view display is restored, but the main processing circuit 307 may have still performed development processing or the like. At this time, the sub-processing circuit 317 and the main processing circuit 307 may be operated simultaneously in order to shorten the period during which no image is displayed on the display unit 311. Further, although the period during which no image is displayed becomes long, in order to reduce power consumption, the sub-processing circuit 317 may be controlled to operate after the processing by the main processing circuit 307 is completed.

Figure 5:
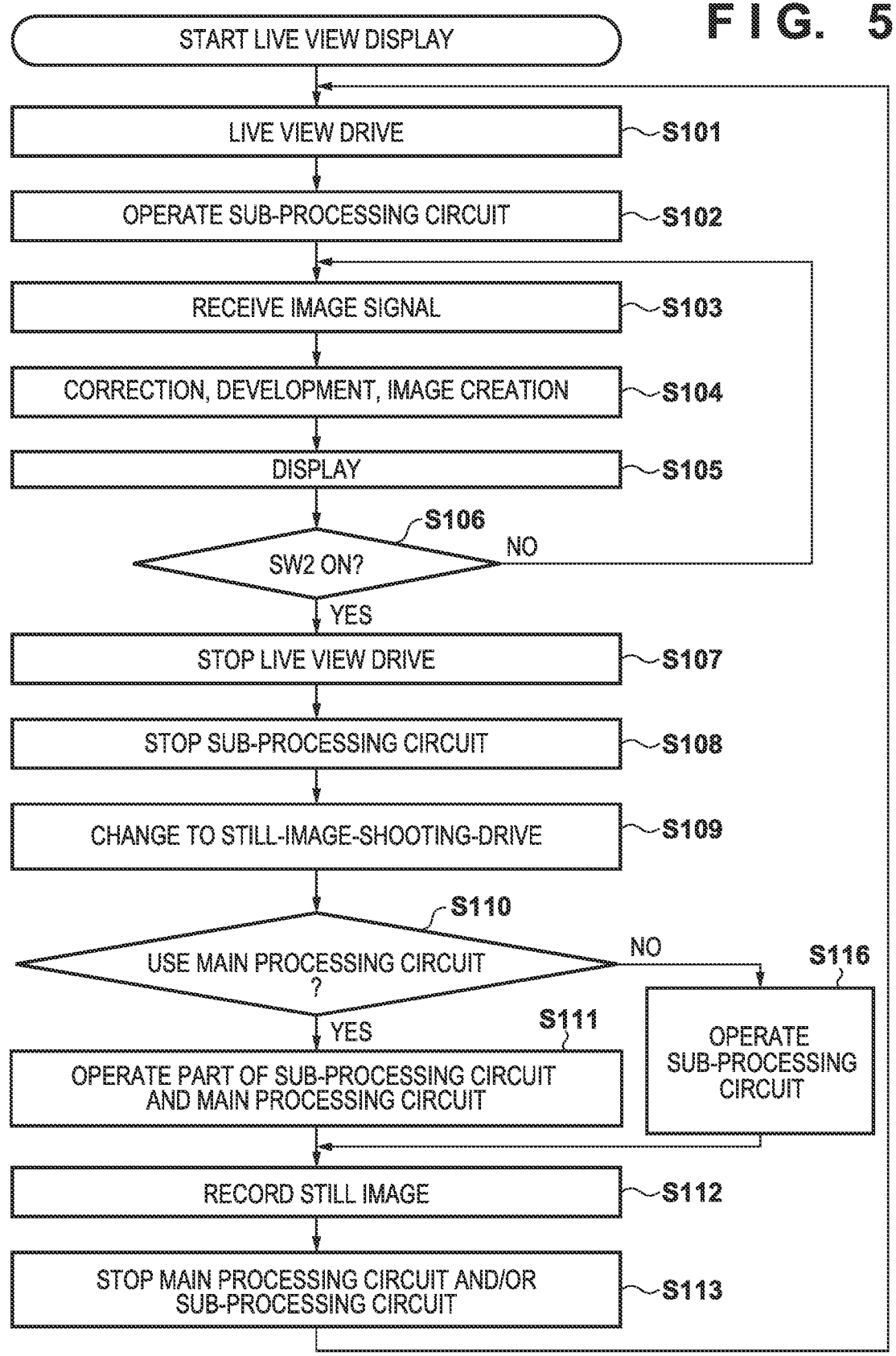
FIG. 5 is a flowchart showing a flow of image processing according to the first embodiment.

FIG. 5 is a flowchart showing the flow of image processing in the first embodiment. This processing is started when the overall control calculation unit 309 instructs the start of the live view display.

First, in step S101, the image sensor 306 starts to be driven by the live view drive. Next, in step S102, the sub-processing circuit 317 is operated according to the determination shown in FIG. 3, and in step S103, the image signal from the image sensor 306 is received by the sub-processing circuit 317. Next, in step S104, the sub-processing circuit 317 performs correction, development, and image creation processing on the image signal, and in step S105, displays the image created in step S104 on the display unit 311.

Next, in step S106, it is determined whether or not the shutter release button (not shown) included in the operation unit 315 is pressed and the switch SW2 is turned on. If it is determined that the switch SW2 is OFF, the process returns to step S103 and the live view display is repeated. On the other hand, if it is determined in step S106 that the switch SW2 is ON, the process proceeds to step S107 to stop the live view drive of the image sensor 306. Next, in step S108, the sub-processing circuit 317 is stopped, and in step S109, the image sensor 306 is changed to be driven by the still image shooting drive.

Then, in step S110, it is determined whether to process image signal by the sub-processing circuit 317 or by the main processing circuit 307 according to the flowchart of FIG. 3.

When it is determined in step S110 that the main processing circuit 307 is to be used, in step S111, a part of the sub-processing circuit 317 is operated to transfer the image signal from the image sensor 306 to the main processing circuit 307. Further, the main processing circuit 307 is operated to process the image signal, and the process proceeds to step S112.

On the other hand, if it is not determined in step S110 to use the main processing circuit 307, the process proceeds to step S116, the sub-processing circuit 317 is operated to process the image signal from the image sensor 306, and the process proceeds to step S112.

In step S112, the still image processed in step S111 or S116 is recorded in the recording medium 312, and in step S113, after stopping the main processing circuit 307 and/or the sub-processing circuit 317, the process returns to step S101 to repeat the live view display.

According to the first embodiment as described above, in a case where the sub-processing circuit is used, the main processing circuit is not used, and in a case where the main processing circuit is used, only a part of the sub-processing circuit is used. By controlling the sub-processing circuit and the main processing circuit in this way, it is possible to generate an image signal of a required quality as well as reduce power consumption in the image capturing apparatus provided with the sub-processing circuit and the main processing circuit.

Modification of First Embodiment

Next, a modification of the first embodiment of the present invention will be described. In this modification, whether an image signal is processed by the sub-processing circuit 317 or by the main processing circuit 307 is determined based on the conditions different from those shown in FIG. 3.

In this modification, in addition to the conditions of the temperature and the remaining battery level used in the determination in FIG. 3, the determination is performed on the condition of live view display, still image shooting, and moving image shooting. Further, the conditions during the live view display include an amount of noise and whether or not the apparatus is connected to the external I/F unit 313 such as HDMI (registered trademark). Furthermore, the conditions in still image shooting include whether the recording image quality is set to Fine, which indicates a high image quality, Normal, which indicates a normal image quality, or Raw. Further, the conditions in the moving image shooting include whether or not the moving image shooting is in a stand-by state and whether the recording size is set to 4K or FHD.

Figure 6:
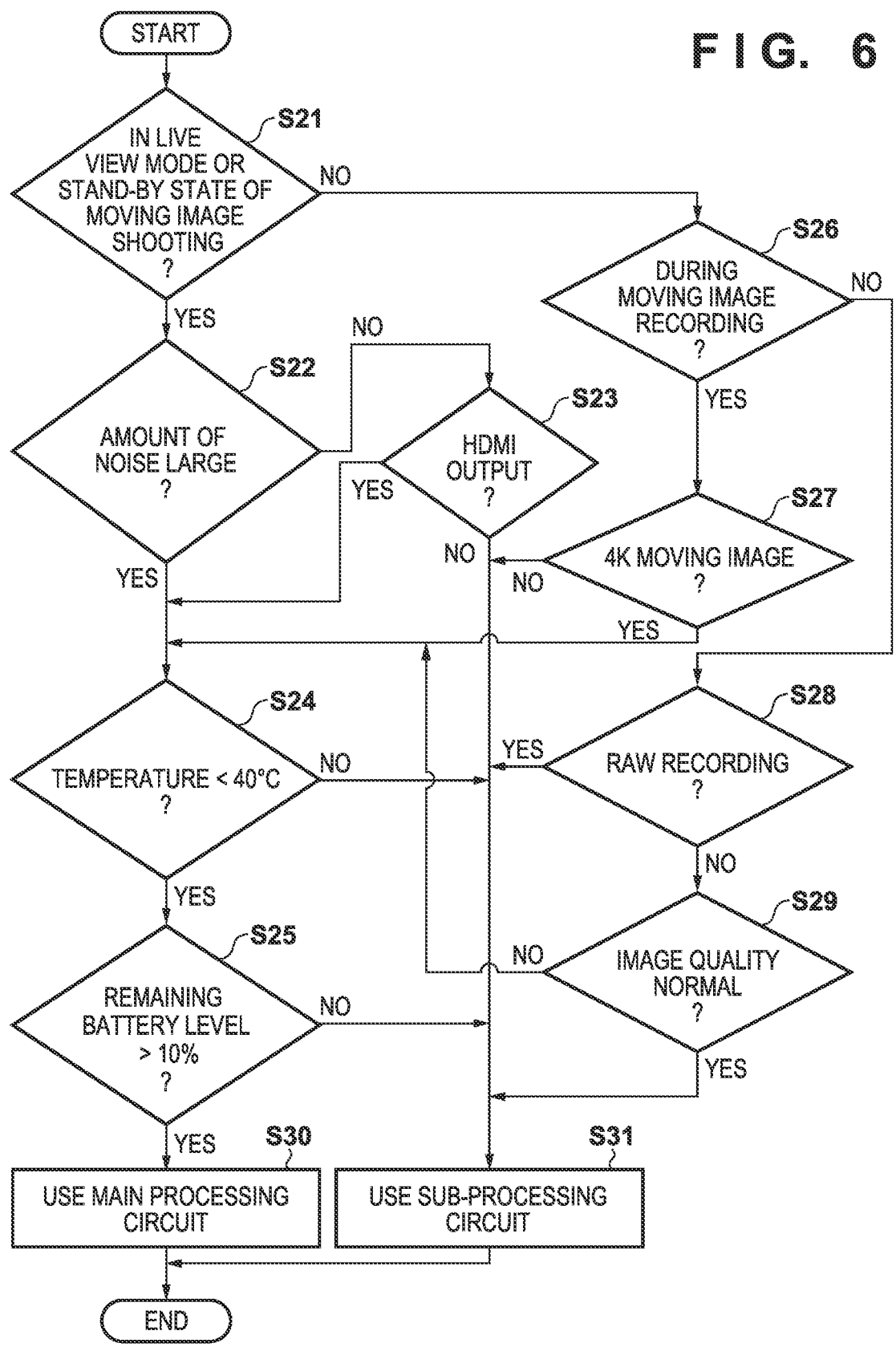
FIG. 6 is a flowchart showing a determination process according to a modification of the first embodiment.

FIG. 6 is a flowchart showing a process of determining whether to process the image signal from the image sensor 306 by the sub-processing circuit 317 or by the main processing circuit 307, which is performed by the overall control calculation unit 309 at the time of normal readout in the modification of the first embodiment.

First, in step S21, the overall control calculation unit 309 determines whether the condition set by the user is in the live view mode or during the stand-by state of moving image shooting.

If it is determined in step S21 that the image capturing apparatus is in the live view mode or the stand-by state of moving image shooting, it is determined in step S22 whether or not an amount of noise is large. Here, the average value of the amount of noise of the image signals of a plurality of frames is measured by the overall control calculation unit 309 during the live view display or during the stand-by state of moving image shooting, and whether or not the calculated amount of noise is above a certain level is determined. Then, if the amount of noise is large, the process proceeds to step S24 to keep an option of using the main processing circuit 307 in order to suppress the deterioration of the image quality.

On the other hand, if the amount of noise is not large, the process proceeds to step S23 to determine whether or not the image capturing apparatus is connected to the predetermined external I/F unit 313 such as HDMI (whether HDMI output or not). In the case of HDMI output, the process proceeds to step S24 to keep the option of using the main processing circuit 307 so that the image quality to the external output can be prioritized over the power consumption. If not in the case of HDMI output, the process proceeds to step S31 and it is determined that the sub-processing circuit 317 is to be used.

On the other hand, if it is determined in step S21 that the image capturing apparatus is not in the live view mode or the stand-by state of moving image shooting, it is determined in step S26 whether or not the moving image is being recorded. If the moving image is not being recorded, the process proceeds to step S28, and if the moving image is being recorded, the process proceeds to step S27 to determine whether or not the recording size of the moving image is 4K. If the recording size is 4K, the process proceeds to step S24 to keep the option of using the main processing circuit 307 in order to prioritize the image quality of a captured image over the power consumption. If the recording size is not 4K, the recording size is FHD, so the process proceeds to step S31 and it is determined that the sub-processing circuit 317 is to be used.

If it is determined in step S26 that the moving image is not being recorded (still image shooting), it is determined in step S28 whether or not a recording format of the still image is Raw. If the recording format is not Raw, the process proceeds to step S29, and if the recording format is Raw, the process proceeds to step S31 and it is determined that the sub-processing circuit 317 is to be used.

In step S29, it is determined whether or not the still image recording quality is Normal. If the still image recording quality is not Normal, the still image recording quality is Fine, so the process proceeds to step S24, the compression rate of image is reduced, and the option of using the main processing circuit 307 is kept so that a high image quality image can be saved. On the other hand, if the still image recording quality is Normal, the process to proceeds to step S31 and it is determined that the sub-processing circuit 317 is to be used.

In step S24, the temperature measured by the thermometer 318 is acquired, and it is determined whether or not the temperature is less than 40° C. If the temperature is 40° C. or higher, the process proceeds to step S31 and it is determined that the sub-processing circuit 317 is to be used. Note that 40° C. is merely an example, and can be appropriately changed depending on the exterior and shape of the image capturing apparatus.

If it is determined in step S24 that the temperature is less than 40° C., the process proceeds to step S25, the remaining battery level of the power supply 319 is measured, and it is determined whether or not the remaining battery level exceeds 10%. Note that 10% of the remaining battery level is merely an example, and can be appropriately changed depending on the power consumption of the entire image capturing apparatus and the like.

If it is determined in step S25 that the remaining battery level exceeds 10%, the process proceeds to step S30 and it is determined that the main processing circuit 307 is to be used. In this case, the sub-processing circuit 317 merely transfers the image signal to the main processing circuit 307, thereby priority is given to image quality over power consumption.

On the other hand, if the remaining battery level is 10% or less, the process proceeds to step S31 and it is determined that the sub-processing circuit 317 is to be used. In this case, power consumption can be suppressed by not using the main processing circuit 307 during processing by the sub-processing circuit 317 is in progress.

Figure 7A:
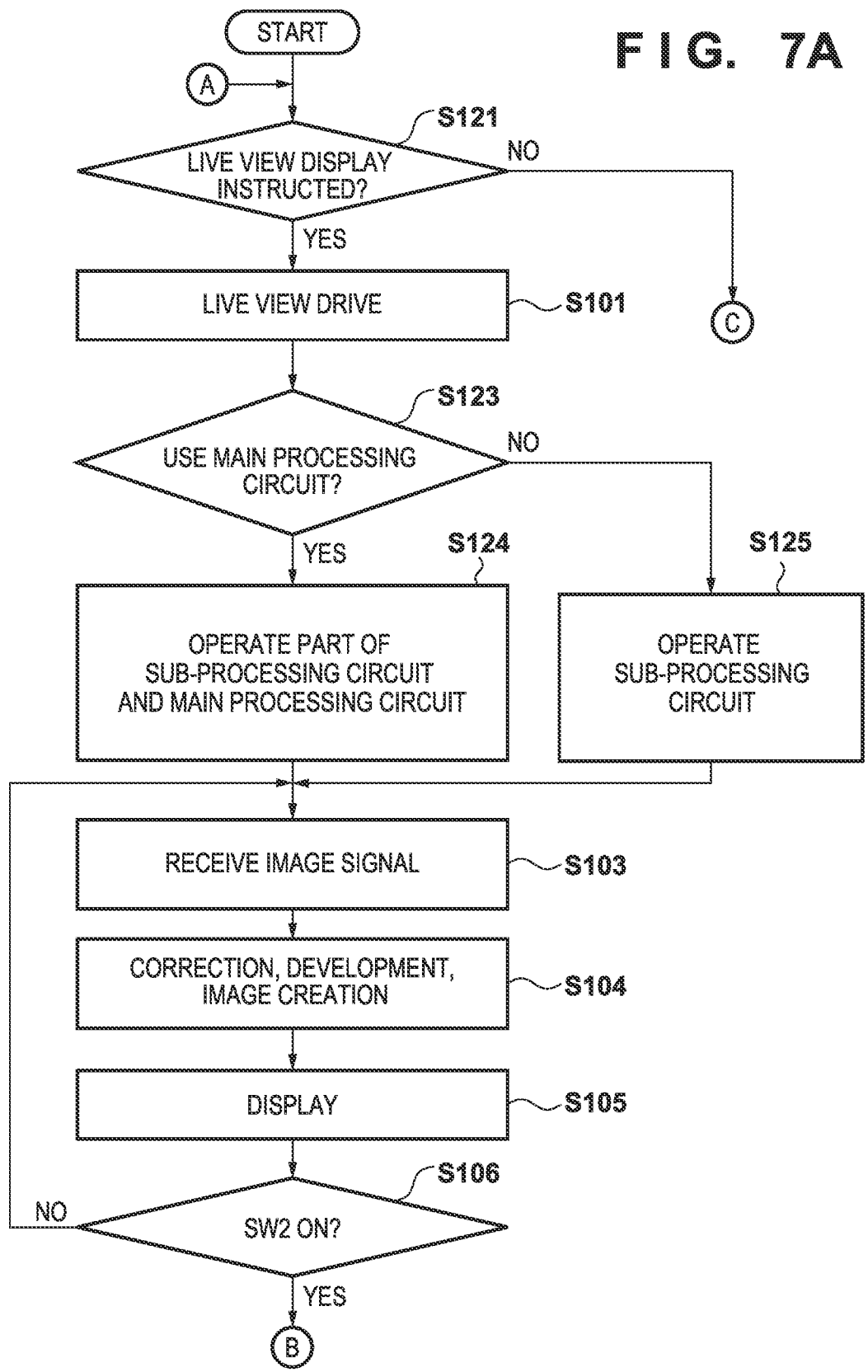
FIG. 7A is a flowchart showing a flow of image processing according to the modification of the first embodiment.
Figure 7B:
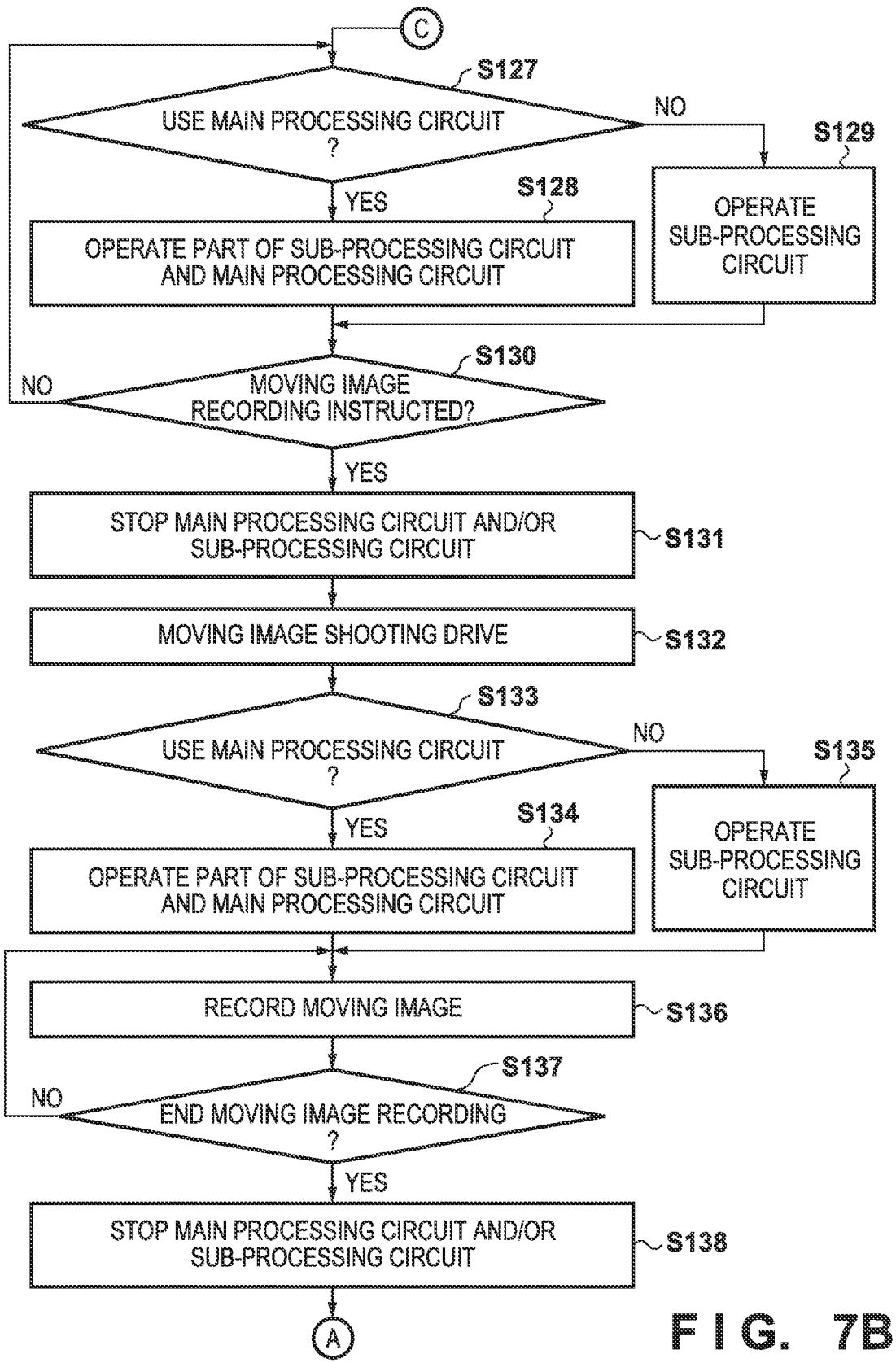
FIG. 7B is a flowchart showing the flow of image processing according to the modification of the first embodiment.
Figure 7C:
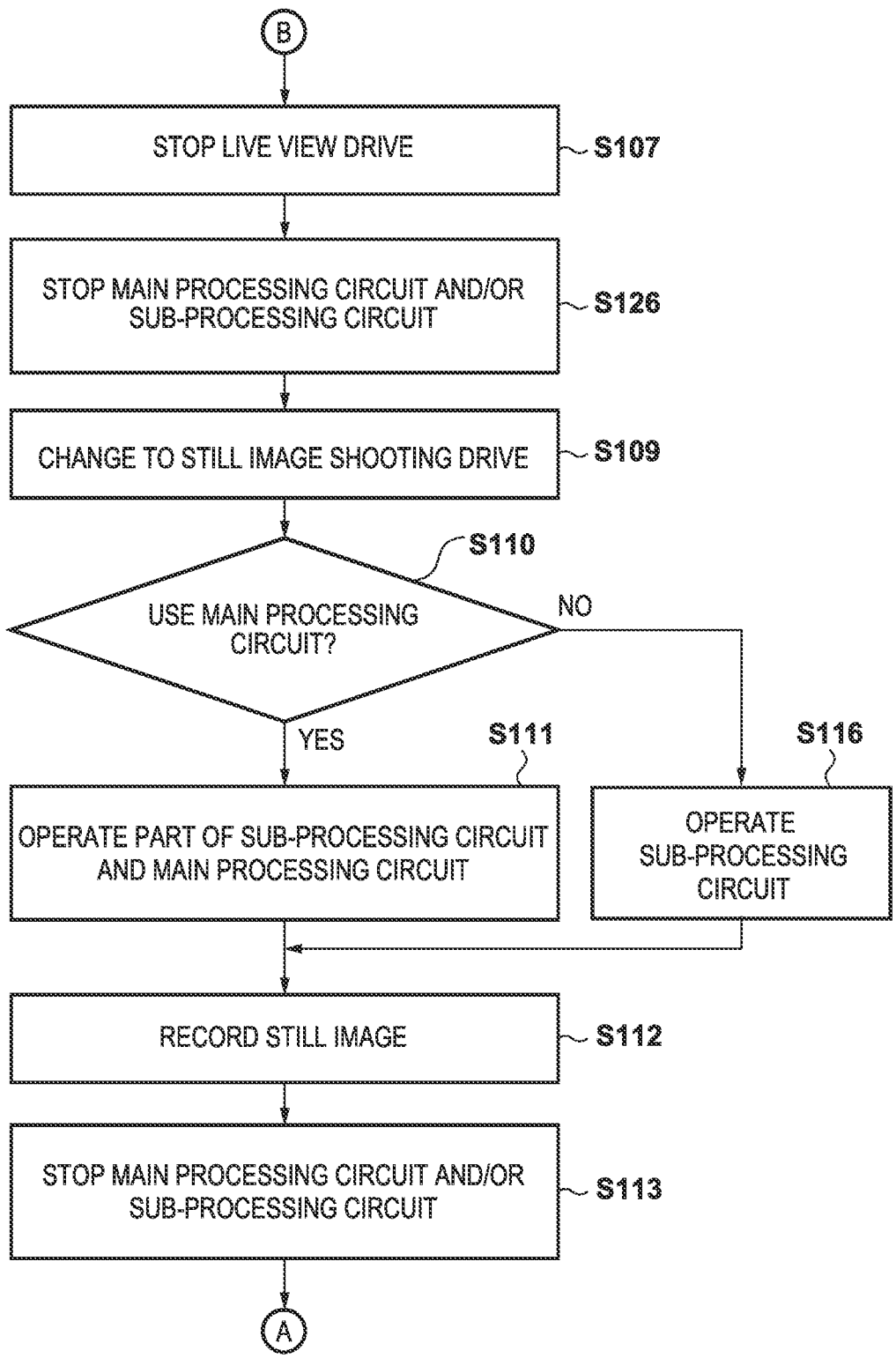
FIG. 7C is a flowchart showing the flow of image processing according to the modification of the first embodiment.

Next, the flow of image processing in the modification of the first embodiment will be described with reference to the flowcharts of FIGS. 7A to 7C. This process is performed by the overall control calculation unit 309. In FIGS. 7A to 7C, the same reference numbers are assigned to the same processes as in FIG. 5, and the description thereof will be omitted as appropriate.

First, it is determined in step S121 of FIG. 7A whether or not the start of live view display is instructed, and if the start of live view display is instructed, the image sensor 306 is changed to the live view drive in step S101.

After that, in step S123, the determination process shown in FIG. 6 is performed to determine whether or not to use the main processing circuit 307. In a case of using the main processing circuit 307, the process proceeds to step S124, a part of the sub-processing circuit 317 is operated to transfer the image signal from the image sensor 306 to the main processing circuit 307, and the main processing circuit 307 is operated to process the image signal. Then, the processed signal is displayed on the display unit 311 and the process proceeds to step S103.

On the other hand, if the sub-processing circuit 317 is to be used, the process proceeds to step S125, the sub-processing circuit 317 is operated to process the image signal, the processed image signal is displayed on the display unit 311 and the process proceeds to step S103.

The processes from steps S103 to S113 in FIG. 7C is the same as the processes described in the first embodiment except that instead of step S108 in FIG. 5, the main processing circuit 307 and/or the sub-processing circuit 317 driven in step S124 or S125 is stopped in S126.

Further, in a case where the start of the live view display is not instructed in step S121, the determination process shown in FIG. 6 is performed in step S127 of FIG. 7B to determine whether to use the main processing circuit 307 or not. Here, for example, the stand-by state of moving image shooting is included, and a signal is read out by driving the image sensor 306 according to the state at that time.

In a case of using the main processing circuit 307, the process proceeds to step S128, where a part of the sub-processing circuit 317 is operated to transfer the image signal from the image sensor 306 to the main processing circuit 307, and the main processing circuit 307 is operated to process the image signal. On the other hand, in a case of using the sub-processing circuit 317, the process proceeds to step S129, and the sub-processing circuit 317 is operated to process the image signal. After step S128 or S129, the process proceeds to step S130.

In step S130, it is determined whether or not the moving image recording is instructed by pressing the recording button (not shown) included in the operation unit 315. If the moving image recording is not instructed, the process returns to step S127, and if instructed, the process proceeds to step S131 to stop the main processing circuit 307 and/or the sub-processing circuit 317 driven in step S128 or S129.

In step S132, the moving image shooting drive is started, the determination process shown in FIG. 6 is performed in step S133, and it is determined whether or not to use the main processing circuit 307. In a case of using the main processing circuit 307, the process proceeds to step S134, where a part of the sub-processing circuit 317 is operated to transfer the image signal from the image sensor 306 to the main processing circuit 307, and the main processing circuit 307 is operated. Thereafter, the process proceeds to step S136.

On the other hand, if it is not determined to use the main processing circuit 307, the process proceeds to step S135, the sub-processing circuit 317 is operated, and the process proceeds to step S136.

In step S136, the image signal from the image sensor 306 is processed by the main processing circuit 307 and/or the sub-processing circuit 317, and the moving image is recorded in the recording medium 312. Then, it is determined in step S137 whether or not an instruction to step the moving image recording is issued, and if the stop instruction is not issued, the process returns to step S136 and the moving image recording is continued.

On the other hand, if the instruction to stop the moving image recording is issued, the process proceeds to step S138, the main processing circuit 307 and/or the sub-processing circuit 317 is stopped, the process returns to step S111, and the above-described processes are repeated.

As described above, by selecting the main processing circuit 307 and/or the sub-processing circuit 317, it is possible to obtain a high-quality image as needed as well as reduce the power consumption.

Second Embodiment

Next, a second embodiment of the present invention will be described. In the above-described first embodiment and its modification, the case where the image signal is read out from the image sensor 306 in the normal readout has been described. On the other hand, in the second embodiment, the multi-stream readout in which a readout drive for reading out signals from all pixels of the image sensor 306 (still image drive) and a ⅕ vertical thinning horizontal addition drive (live view drive) are performed in parallel, and obtained signals are output in parallel via a plurality of paths will be described. Since the configuration of the image capturing apparatus according to the second embodiment is the same as that of the first embodiment described with reference to FIGS. 1 and 2, the description thereof will be omitted here.

Further, the process of determining whether to process the image signal by the main processing circuit 307 or by the sub-processing circuit 317 is the same as the process shown in FIG. 3, and thus the description thereof will be omitted.

Figure 8:
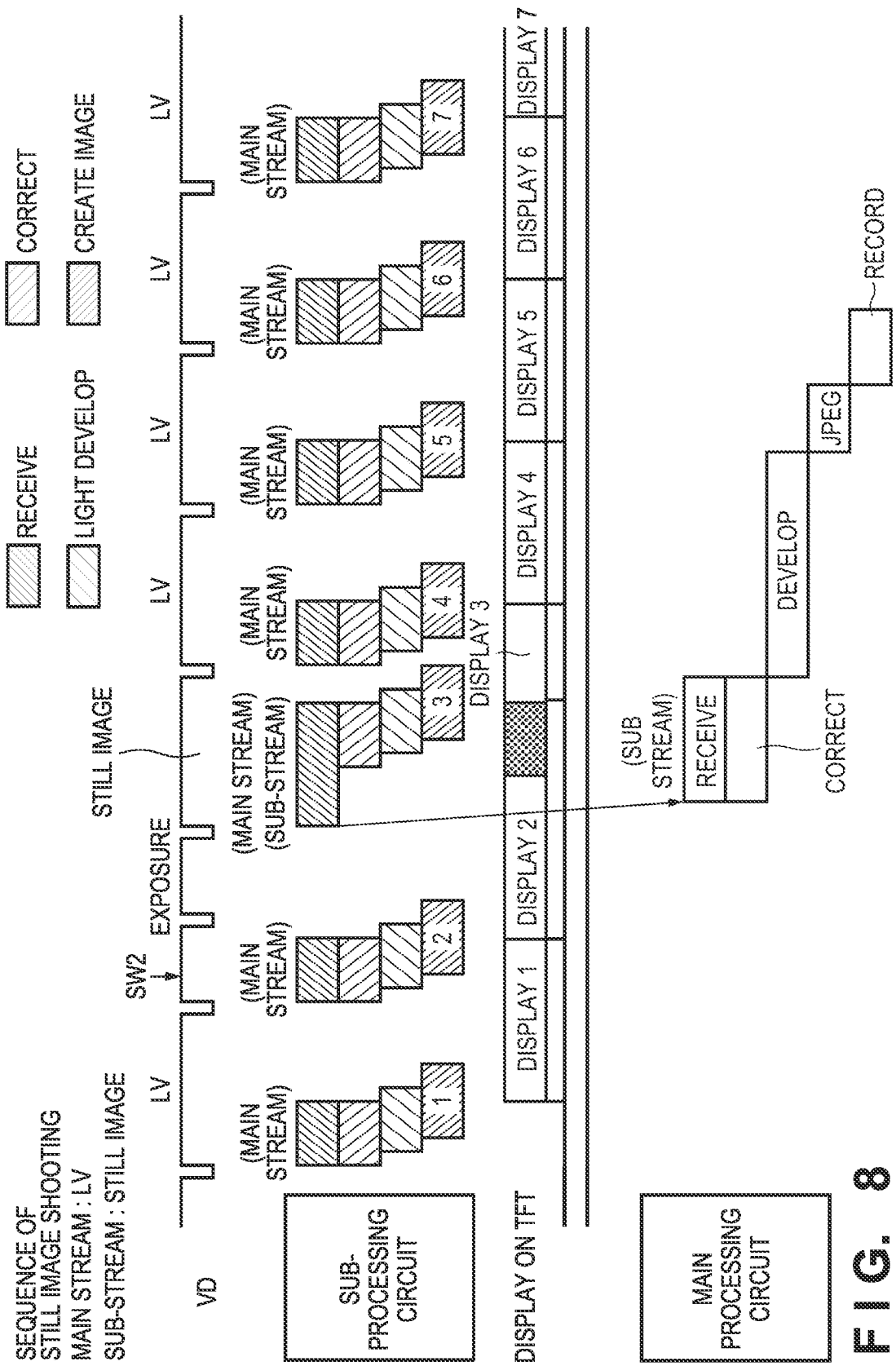
FIG. 8 is a timing diagram showing operation timing of the image sensor and operation timings of the main processing circuit and the sub-processing circuit according to a second embodiment.

FIG. 8 is a timing diagram showing the operation timing of the image sensor 306 and the operation timings of the main processing circuit 307 and the sub-processing circuit 317 in the second embodiment. At the time of multi-stream readout, the image signal obtained by the ⅕ vertical thinning horizontal addition drive (live view drive) is output via the main stream and the image signal obtained by the readout drive for reading out signals from all pixels of the image sensor 306 (still image drive) is output via the sub-stream.

During live view display (LV), the image signal from image sensor 306 is received by the sub-processing circuit 317 in the normal readout, and the image created through correction and development processing is displayed on the display unit 311.

When the shutter release button (not shown) is pressed and the switch SW2 is turned on, the image sensor 306 switches to the multi-stream drive, and the sub-processing circuit 317 receives image signals of two streams, i.e., a main stream and a sub-stream. Then, if it is determined that the main processing circuit 307 is to be used according to the flowchart shown in FIG. 3, the sub-processing circuit 317 transfers the image signal obtained by the still image drive of the image sensor 306 to the main processing circuit 307 via the sub-stream. The image created by the main processing circuit 307 by performing correction and development processing is saved in the recording medium 312.

Further, in the second embodiment, the sub-processing circuit 317 performs corrections and development processing on the image signal from the image sensor 306 received via the main stream, and displays the created live view image on the display unit 311.

Then, upon completion of reading the image signals from the image sensor by the still image drive, the image sensor 306 stops the multi-stream drive and returns to the live view drive.

In this way, the live view display is restored, but the main processing circuit 307 may still be performing development processing or the like on the image. Even in such a case, by operating the sub-processing circuit 317 and the main processing circuit 307 in parallel, it is possible to shorten the period during which the live view image is not displayed on the display unit 311.

Figure 9:
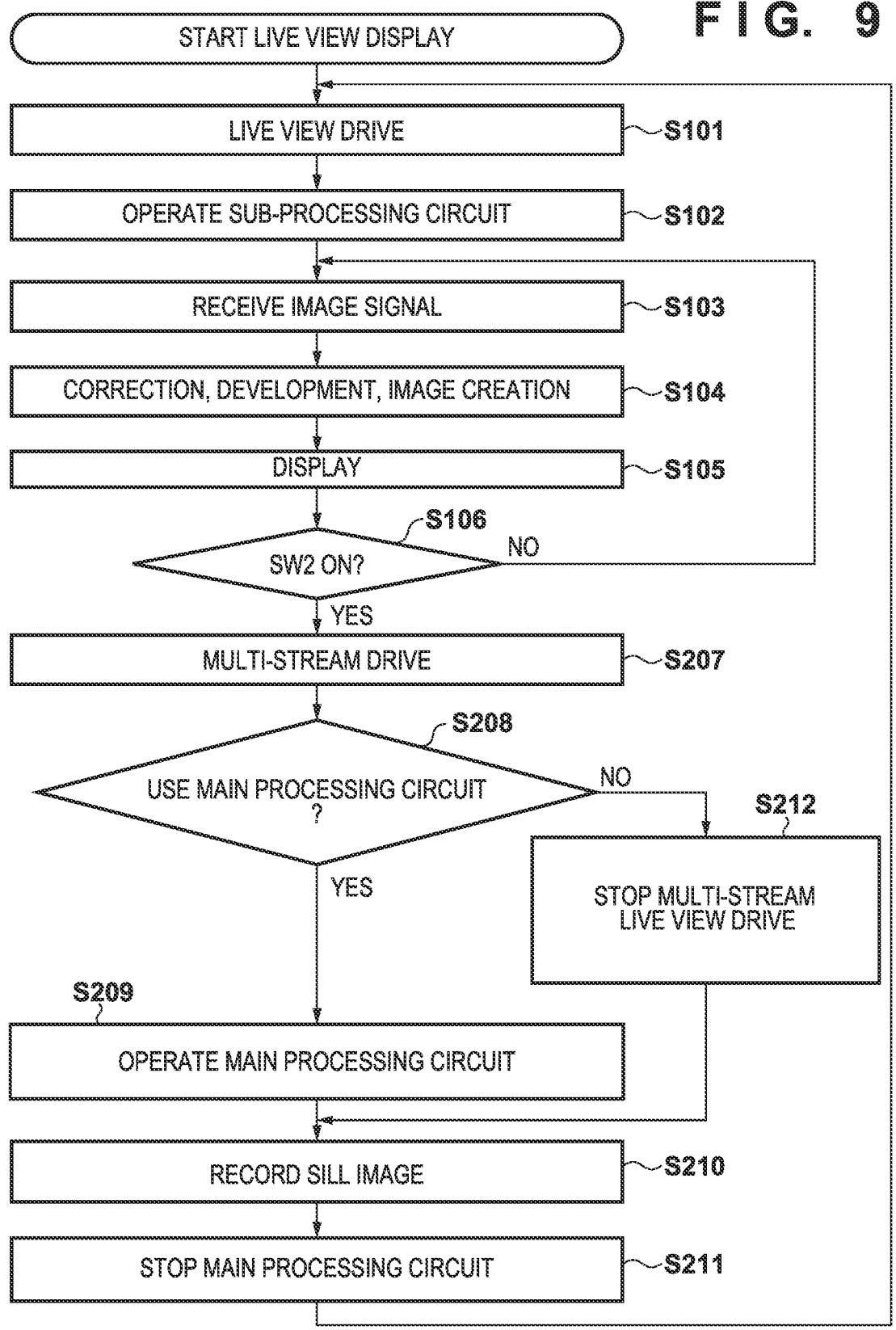
FIG. 9 is a flowchart showing a flow of image processing according to the second embodiment.

FIG. 9 is a flowchart showing the flow of image processing in the second embodiment. This process is started when the overall control calculation unit 309 instructs the start of the live view display. Note that the process shown in FIG. 9 is different from the process shown in FIG. 5 of the first embodiment in that the multi-stream drive is used in a case where the switch SW2 is turned on and a still image shooting is instructed. Therefore, the same step numbers as those in FIG. 5 are assigned to the processes in FIG. 9 until the determination of SW2 is made, and the description thereof will be omitted.

If it is determined in step S106 that the switch SW2 is ON, the process proceeds to step S207 to change the image sensor 306 to be operated in multi-stream drive. Next, in step S208, it is determined whether to process the still image by the sub-processing circuit 317 or by the main processing circuit 307 according to the flowchart of FIG. 3.

If it is determined in step S208 that the main processing circuit 307 is to be used, in step S209, the sub-processing circuit 317 transfers the image signal obtained by the still image drive of the image sensor 306 received via the sub-stream to the main processing circuit 307. The main processing circuit 307 processes the transferred image signal and the process proceeds to step S210.

Here, in the second embodiment, unlike the process shown in FIG. 5, the sub-processing circuit 317 is not stopped. Therefore, the image signal obtained by the live view drive transmitted via the main stream is processed, and the live view display continues.

On the other hand, if it is not determined in step S208 that the main processing circuit 307 is to be used, the multi-stream live view drive is stopped in step S212, and the image signal obtained by the still image drive of the image sensor 306 is processed in the sub-processing circuit 317, and the process proceed to step S210.

Then, in step S210, the processed still image is recorded in the recording medium 312, and in step S211, if the main processing circuit 307 is still operating, the main processing circuit 307 is stopped, and then the process returns to step S101, the live view drive is used, and the live view display is repeated.

According to the second embodiment as described above, although the power consumption during still image shooting is slightly higher than that of the first embodiment, it is possible to reduce the power consumption as a whole.

Modification of Second Embodiment

Next, a modification of the second embodiment of the present invention will be described. In this modification, it is determined whether the image signal is processed by the sub-processing circuit 317 or by the main processing circuit 307 based on the conditions different from those shown in FIG. 3.

In this modification, similarly to the modification of the first embodiment, in addition to the conditions of the temperature and the remaining battery level used in the determination in FIG. 3, the determination is performed on the condition of live view display, still image shooting, and moving image shooting. Further, the conditions during the live view display include the amount of noise and whether or not the apparatus is connected to the external I/F unit 313 such as HDMI (registered trademark). Furthermore, the conditions in still image shooting include whether the recording image quality is set to Fine, which indicates a high image quality, Normal, which indicates a normal image quality, or Raw. Further, the conditions in the moving image shooting include whether the moving image shooting is in a stand-by state and whether the recording size is set to 4K or FHD.

Figure 10:
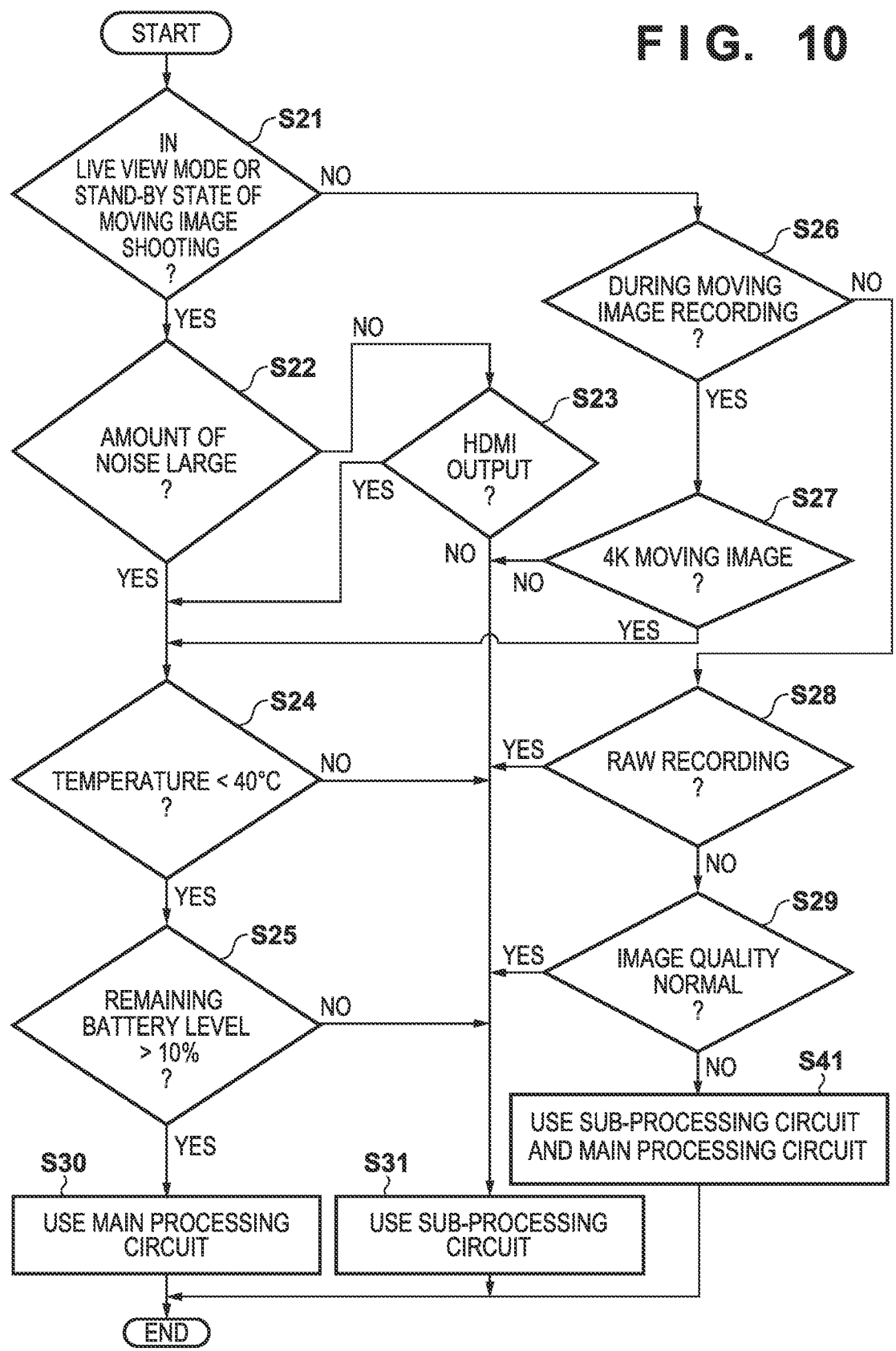
FIG. 10 is a flowchart showing a determination process according to a modification of the second embodiment.

FIG. 10 is a flowchart showing a process of determining whether to process the image signal from the image sensor 306 by the sub-processing circuit 317 or by the main processing circuit 307, which is performed by the overall control calculation unit 309 in the modification of the second embodiment. The process performed in a case where the image quality of the still image is determined not to be Normal (i.e., Fine) in step S29 in the determination process shown in FIG. 10 is different from the determination process shown in FIG. 6 of the first embodiment. Other than that, since it is the same as that shown in FIG. 6, the same step numbers are assigned to the same processes and the description thereof will be omitted.

In a case where it is determined in step S29 that the image quality of the still image is not Normal (i.e., Fine), the process proceeds to step S41, it is determined that the sub-processing circuit 317 is used to process the image signal of the main stream and the main processing circuit 307 is used to process the image signal of the sub-stream.

Figure 11:
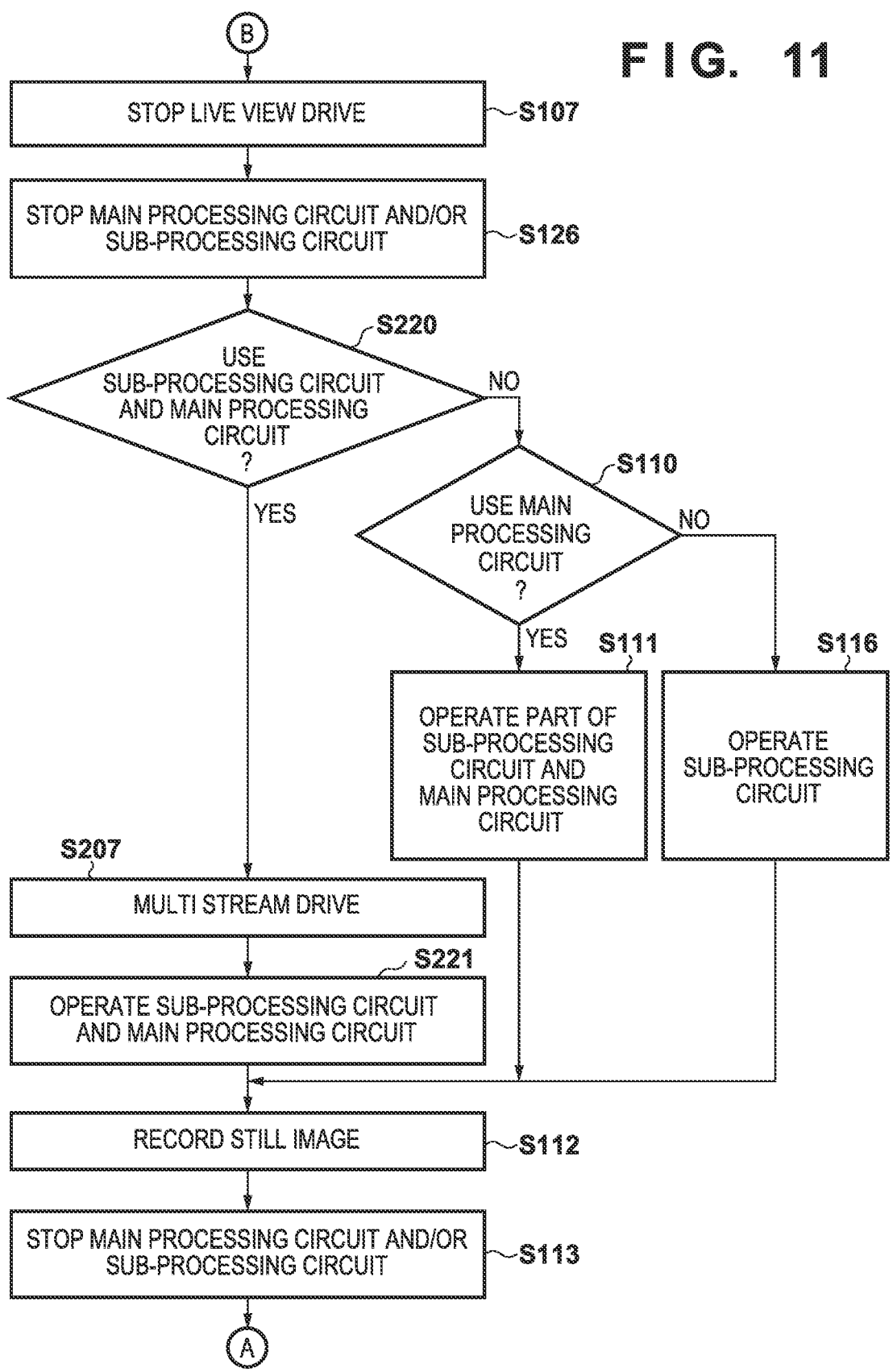
FIG. 11 is a flowchart showing a flow of image processing according to the modification of the second embodiment.

Next, the flow of image processing in the modification of the second embodiment will be described. The process performed here is, among the processes shown in the flowcharts of FIGS. 7A to 7C in the second embodiment, that the process shown in the flowchart of FIG. 7C is replaced with the process shown in the flowchart of FIG. 11, which is performed by the overall control calculation unit 309. Therefore, only the process shown in the flowchart of FIG. 11 will be described below. In FIG. 11, the same processes as in FIG. 7C are assigned the same step numbers, and the description thereof will be omitted as appropriate.

When the main processing circuit 307 and/or the sub-processing circuit 317 driven in step S124 or S125 of FIG. 7A is stopped in step S126, in step S220, it is determined whether or not to use the sub-processing circuit 317 and the main processing circuit 307 according to the flowchart of FIG. 10. If the sub-processing circuit 317 and main processing circuit 307 are not to be used, the process proceeds to step S110, and if they are to be used, the process proceeds to step S207 to change to drive the image sensor 306 by multi-stream drive.

Next, in step S221, the sub-processing circuit 317 and the main processing circuit 307 are driven, the image signal of the main stream is processed by the sub-processing circuit 317 and displayed as a live view, and the image signal of the sub-stream is processed by the main processing circuit 307 and recorded in step S112.

In this way, by selecting the main processing circuit 307 and the sub-processing circuit 317, it becomes possible to obtain high-quality images as needed and reduce power consumption even during multi-stream driving.

In each of the above embodiments, a plurality of examples are given as criteria for determining whether to process an image signal by the sub-processing circuit 317 or by the main processing circuit 307, but these are examples of the criteria, and the present invention is not limited to these examples. The combination of the illustrated criteria may be changed, or only some of the criteria may be used. Alternatively, another criterion not illustrated above may be added, or only another criterion may be used.

According to the present invention, in an image processing apparatus provided with two or more processing circuits for processing an image signal, it is possible to reduce power consumption while obtaining an image having a required image quality.

OTHER EMBODIMENTS

The present invention may be applied to a system composed of a plurality of devices (for example, a camera head and an image processing apparatus), or may be applied to a device composed as one device.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising one or more processors and/or circuitry which functions as:
    a first processor that processes an image signal output from an image sensor;
    a second processor, connected in downstream of the first processor, that processes an image signal transferred from the first processor; and
    a controller that selects the first processor and/or the second processor to be used to perform a predetermined process on the image signal output from the image sensor based on a predetermined condition,
    wherein the controller controls to stop an operation of the second processor in a case where the controller selects the first processor,
    the predetermined condition includes an instruction for live view display, and
    the controller selects the first processor in a case where the live view display is instructed.

2. The image processing apparatus according to claim 1, wherein, in a case where the controller selects the second processor, the first processor does not perform the predetermined process on the image signal output from the image sensor and transfer the image signal output from the image sensor to the second processor.

3. The image processing apparatus according to claim 1, wherein the second processor has a larger circuit scale than the first processor and performs the predetermined process at higher accuracy than the first processor.

4. The image processing apparatus according to claim 1, wherein the controller selects the second processor in a case where image quality is given priority based on the predetermined condition.

5. The image processing apparatus according to claim 1, wherein the predetermined condition includes at least one of temperature at the image processing apparatus and remaining battery level.

6. The image processing apparatus according to claim 1, wherein the predetermined condition includes image quality set for still image shooting.

7. The image processing apparatus according to claim 1, wherein the predetermined condition includes image quality set for moving image shooting.

8. The image processing apparatus according to claim 1, wherein the predetermined condition includes an amount of noise included in the image signal.

9. The image processing apparatus according to claim 1, wherein the predetermined condition includes a type of an external output of a processed image signal.

10. The image processing apparatus according to claim 1, wherein, in a case where the controller selects the second processor followed by selecting the first processor based on the predetermined condition, the first processor and the second processor perform the predetermined process in parallel.

11. The image processing apparatus according to claim 1, wherein the image sensor is capable of outputting image signals of a plurality of different resolutions via a plurality of different paths, and
the controller performs the selection such that an image signal with a first resolution is processed by the first processor and an image signal with a second resolution higher than the first resolution is processed by the second processor.

12. The image processing apparatus according to claim 11, wherein the image sensor outputs image signals of the plurality of different resolutions in a case where still image shooting with predetermined image quality is instructed.

13. The image processing apparatus according to claim 1, wherein the predetermined process includes at least one of shading correction, low-pass filter correction, sharpness correction, contrast correction and false color correction.

14. An image capturing apparatus comprising:
an image sensor; and
an image processing apparatus that comprises one or more processors and/or circuitry which functions as:
a first processor that processes an image signal output from the image sensor;
a second processor, connected in downstream of the first processor, that processes an image signal transferred from the first processor; and
a controller that selects any of the first processor and the second processor to be used to perform a predetermined process on the image signal output from the image sensor based on a predetermined condition,
wherein the controller controls to stop an operation of the second processor in a case where the controller selects the first processor,
the predetermined condition includes an instruction for live view display, and
the controller selects the first processor in a case where the live view display is instructed.

15. A control method of an image processing apparatus that comprises one or more processors and/or circuitry which functions as a first processor that processes an image signal output from an image sensor and a second processor, connected in downstream of the first processor, that processes an image signal transferred from the first processor, the method comprising:
selecting the first processor and/or the second processor to be used to perform a predetermined process on the image signal output from the image sensor based on a predetermined condition; and
processing the image signal by the selected first processor and/or second processor,
wherein an operation of the second processor stopped in a case where the first processor is selected,
the first processor transfers the image signal to the second processor without processing the image signal in a case where the second processor is selected,
the predetermined condition includes an instruction for live view display, and
the first processor is selected in a case where the live view display is instructed.

16. A non-transitory computer-readable storage medium, the storage medium storing a program that is executable by the computer, wherein the program includes program code for causing the computer to function as an image processing apparatus comprising:
a first processor that processes an image signal output from an image sensor;
a second processor, connected in downstream of the first processor, that processes an image signal transferred from the first processor; and
a controller that selects any of the first processor and the second processor to be used to perform a predetermined process on the image signal output from the image sensor based on a predetermined condition,
wherein the controller controls to stop an operation of the second processor in a case where the controller selects the first processor,
the predetermined condition includes an instruction for live view display, and
the controller selects the first processor in a case where the live view display is instructed.

* * * * *